(12) United States Patent
Borle

(10) Patent No.: US 10,778,465 B1
(45) Date of Patent: Sep. 15, 2020

(54) SCALABLE CLOUD SWITCH FOR INTEGRATION OF ON PREMISES NETWORKING INFRASTRUCTURE WITH NETWORKING SERVICES IN THE CLOUD

(71) Applicant: Fortinet, Inc., Sunnyvale, CA (US)

(72) Inventor: Sandip Y. Borle, Cupertino, CA (US)

(73) Assignee: Fortinet, Inc., Sunnyvale, CA (US)

( * ) Notice: Subject to any disclaimer, the term of this patent is extended or adjusted under 35 U.S.C. 154(b) by 0 days.

(21) Appl. No.: 16/373,463

(22) Filed: Apr. 2, 2019

(51) Int. Cl.
| | |
|---|---|
| *H04L 12/46* | (2006.01) |
| *H04L 12/931* | (2013.01) |
| *G06F 9/54* | (2006.01) |
| *G06F 9/50* | (2006.01) |
| *G06F 9/455* | (2018.01) |

(52) U.S. Cl.
CPC ........ *H04L 12/4633* (2013.01); *G06F 9/5016* (2013.01); *G06F 9/541* (2013.01); *H04L 49/70* (2013.01); *G06F 2009/45595* (2013.01)

(58) Field of Classification Search
CPC ........ H04L 1/12; H04L 49/70; H04L 67/1097
See application file for complete search history.

(56) References Cited

U.S. PATENT DOCUMENTS 9,584,445 B2 * 2/2017 Stubberfield ......... H04L 49/354

OTHER PUBLICATIONS

"FortiSwitch Cloud—Administration Guide, Version 4.1.a", FORTINET, Feb. 20, 2019, 44 pages.

* cited by examiner

*Primary Examiner* — Chandrahas B Patel
(74) *Attorney, Agent, or Firm* — Jaffery Watson Mendonsa & Hamilton LLP

(57) ABSTRACT

Systems and methods are described for integration of networking infrastructure with network services running in a Virtual Private Cloud (VPC) of an enterprise network. According to one embodiment, a cloud switch implemented by cloud services provided by a cloud service provider, creates a logical cloud port to provide connectivity to one of multiple resources provided by the cloud service provider. The cloud switch creates a physical cloud port to provide connectivity to a physical, on-premises network infrastructure component of multiple physical network infrastructure components within the enterprise network. The logical cloud port is associated with a particular resource and the physical cloud port is associated with a physical port of a physical network infrastructure component of the multiple physical network infrastructure components.

20 Claims, 10 Drawing Sheets

SCALABLE CLOUD SWITCH FOR INTEGRATION OF ON PREMISES NETWORKING INFRASTRUCTURE WITH NETWORKING SERVICES IN THE CLOUD

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2019, Fortinet, Inc.

BACKGROUND

Field

Embodiments of the present invention generally relate to network communication systems. In particular, embodiments of the present invention relate to facilitating seamless and efficient integration of networking infrastructure components from on-premise, remote locations and/or the cloud by providing a scalable cloud switch implemented based on cloud services and therefore limited only by the underlying cloud resources.

Description of the Related Art

Enterprises are presently using hybrid environments, a combination of cloud-based and on-premises network infrastructure, to support their enterprise networks. The cloud network portion of an enterprises' network is commonly referred to as a Virtual Private Cloud (VPC) and may be provided by multiple public cloud providers. Enterprises are increasingly moving their information technology (IT) infrastructure to the cloud, thereby creating a need for seamless integration of on-premises networking infrastructure with networking services in the cloud.

While various solutions, including hybrid cloud frameworks, have attempted to address integration problems, existing solutions do not provide truly seamless integration with respect to deployment, configuration and maintenance of physical, on-premises network components, remote locations and the cloud. For example, a network administrator is required to setup special physical and virtual solutions to form a link between the cloud services and entry point into on-premises network, which is basically embodying two networks communicatively coupled through a link. With respect to setup, the user needs to setup a Virtual Private Network (VPN) connection, perform configuration for multiple locations (e.g., the cloud network and the on-premises network), make sure the VPN technologies used on both ends (e.g., the cloud network and the on-premises network) are compatible. The VPN technologies can range from Internet Protocol Secure (IPSec), Secure Sockets Layer (SSL) or other tunneling protocols. Meanwhile, even after the VPN connection is setup, maintenance and monitoring of the connection represents an additional burden as it needs to be done in a disjoint manner from both sides (e.g., the cloud side and the on-premises side). Furthermore, such a topology does not give a uniform network view to users or the network administrator. In the context of a typical hybrid environment, these and other limitations make it difficult for enterprises to grow their enterprise networks either in the cloud or by adding physical, on-premises network infrastructure.

In view of the foregoing, there is a need in the art for a technological solution that addresses the limitations associated with achieving seamless and efficient integration of on-premises networking infrastructure with cloud services.

SUMMARY

Systems and methods are described for use of a scalable cloud switch to facilitate integration of on-premises networking infrastructure with network services in the cloud, for example, running in a Virtual Private Cloud (VPC) of an enterprise. According to one embodiment, a cloud switch implemented by cloud services provided by a cloud service provider, receives a first request by a network administrator of an enterprise network to add a first cloud port to the cloud switch in form of a logical cloud port. The logical cloud port is used to provide connectivity to one of multiple resources provided by the cloud service provider. In response to the first request the cloud switch creates the logical cloud port. The cloud switch receives a second request by the network administrator to add a second cloud port to the cloud switch in a form of a physical cloud port. The physical cloud port is used to provide connectivity between a physical, on-premises network infrastructure component of multiple physical network infrastructure components within the enterprise network and the cloud switch. In response to the second request, the cloud switch creates the physical cloud port. Further, the cloud switch receives a third request by the network administrator to create an association between the logical cloud port and a particular resource of the multiple resources. In response to the third request, the cloud switch creates the association between the logical cloud port and the particular resource. Furthermore, the cloud switch receives a fourth request by the network administrator to create an association between the physical cloud port and a physical port of a physical network infrastructure component of the multiple physical network infrastructure components. In response to the fourth request, the cloud switch creates the association between the physical cloud port and the physical port of the physical network infrastructure component.

Other features of embodiments of the present disclosure will be apparent from accompanying drawings and detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Figure 1:
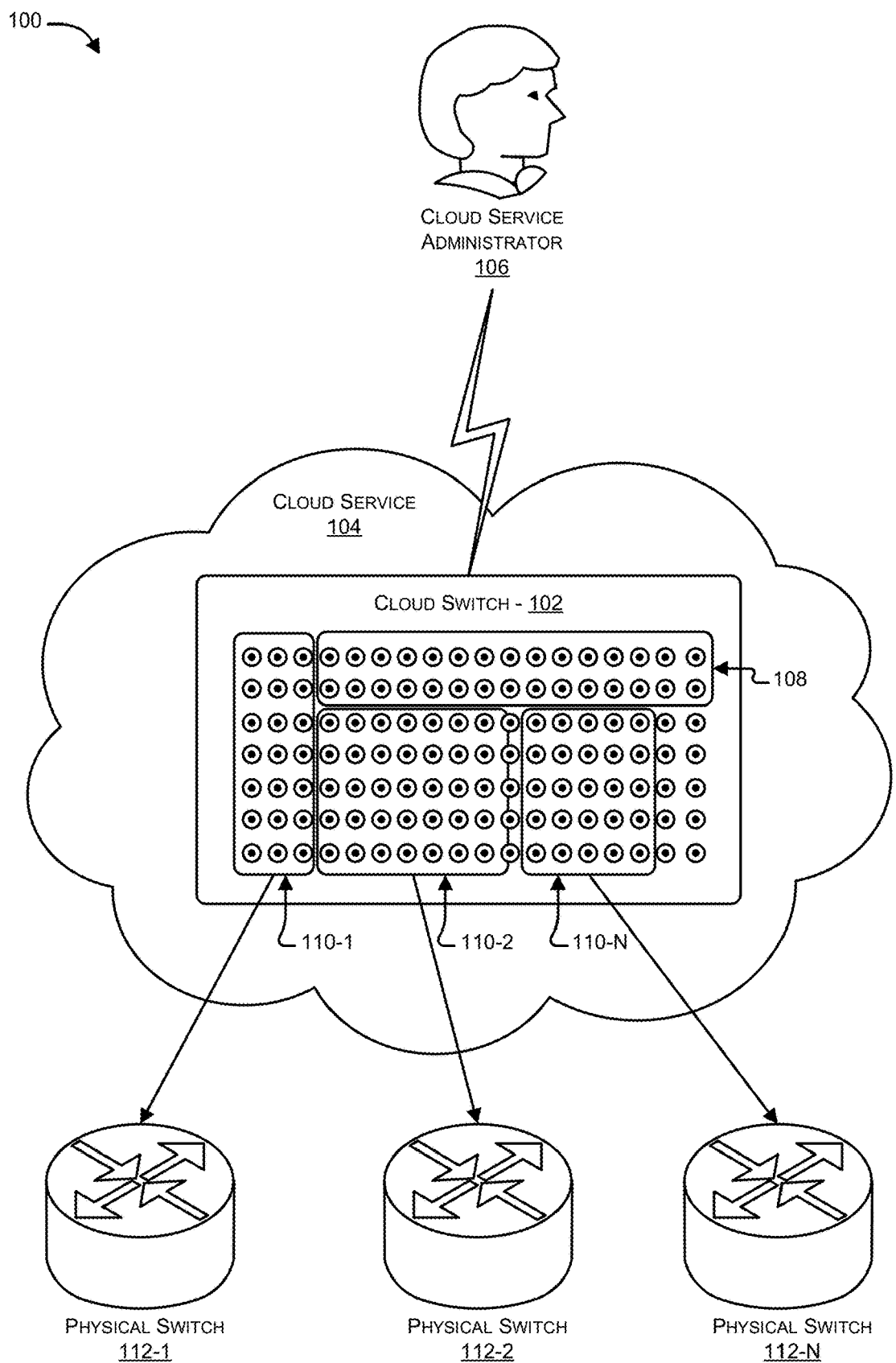
FIG. 1 illustrates a simplified network architecture in which aspects of the present invention can be implemented in accordance with an embodiment of the present invention.

Systems and methods are described for use of a scalable cloud switch to facilitate integration of on-premises networking infrastructure with network services in the cloud, for example, running in a Virtual Private Cloud (VPC) of an enterprise. Embodiments of the present invention addresses various existing limitations associated with achieving seamless and efficient integration of on-premises networking infrastructure with cloud services by providing an innovative way to build a network that seamlessly integrates on-premises network components, network components associated with remote locations (e.g., branch offices) and networking services in the cloud. In embodiments of the present invention, a cloud switch, through which a network administrator may connect and control the rest of the enterprise's information technology (IT) infrastructure, is implemented by cloud services. In this manner, a full representation of a switch is hosted in the cloud; however, when there are temporary issues in achieving connectivity to the cloud, such temporary connectivity issues do not bring the whole network down. Rather, the on-premises physical components associated with the cloud switch continue to work seamlessly.

Because the cloud switch is not a physical or virtual machine, but instead is implemented by cloud services, it is essentially infinitely scalable from the perspective of the enterprise as it is limited only by the underlying cloud resources. In addition to the scalability advantages, the typical network administration burdens associated with performing deployment, configuration, maintenance and monitoring of an integrated networking infrastructure including on-premises networking infrastructure spanning multiple sites (e.g., a headquarters and one or more branch offices) and the enterprise's VPC (which may be provided by multiple public cloud providers) cloud services are drastically reduced as the network administrator can perform these administrative functions efficiently via a single management interface provided by the cloud switch. Furthermore, the cloud switch provides the enterprise with the flexibility to easily grow its hybrid network infrastructure either in the cloud or in on-premises physical infrastructure.

In the following description, numerous specific details are set forth in order to provide a thorough understanding of embodiments of the present invention. It will be apparent to one skilled in the art that embodiments of the present invention may be practiced without some of these specific details.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, firmware and/or by human operators.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

Although the present invention has been described with the purpose of computer network policy searching, it should be appreciated that the same has been done merely to illustrate the invention in an exemplary manner and any other purpose or function for which the explained structure or configuration can be used, is covered within the scope of the present invention.

Exemplary embodiments will now be described more fully hereinafter with reference to the accompanying drawings, in which exemplary embodiments are shown. This invention may, however, be embodied in many different forms and should not be construed as limited to the embodiments set forth herein. These embodiments are provided so that this invention will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named.

Terminology

Brief definitions of terms used throughout this application are given below.

The phrase "security device" generally refers to a hardware device or appliance configured to be coupled to a network and to provide one or more of data privacy, protection, encryption and security. The network security device can be a device providing one or more of the following features: network firewalling, VPN, antivirus, intrusion prevention (IPS), content filtering, data leak prevention, antispam, antispyware, logging, reputation-based protections, event correlation, network access control, vulnerability management, application control, load balancing and traffic shaping—that can be deployed individually as a point solution or in various combinations as a unified threat management (UTM) solution. Non-limiting examples of network security devices include proxy servers, firewalls, VPN appliances, gateways, UTM appliances and the like.

The phrase "cloud service" refers to any service made available to users on demand via the Internet from servers of a cloud computing service provider as opposed to being provided from on-premises servers of an enterprise. Cloud services are designed to provide easy, scalable access to virtual hardware (e.g., Linux virtual machines, Windows virtual machines, blob storage, file storage, managed disks), software, infrastructure, applications (e.g., firewalling, Single Sign-On, databases, developer tools) and other services and resources, and are fully managed by the cloud services provider. Non-limiting examples of cloud service providers and their respective cloud computing platforms include Amazon (Amazon Web Services), Kamatera (Kamatera cloud computing infrastructure), Microsoft Corporation (Microsoft Azure), Google (Google Cloud Platform), Adobe Systems (Adobe Creative Cloud), VMware (VMware Cloud), IBM (IBM cloud), Oracle (Oracle Cloud), Red Hat (Red Hat Cloud) and Rackspace (Rackspace Cloud).

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but is not limited to, Layer 2/3 routing, content inspection, content filtering, firewall, traffic shaping, application control, Voice over Internet Protocol (VoIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), FORTIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

While embodiments of the present invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claim.

According to an aspect of the present disclosure, a network administrator may add one or more basic units of connectivity (referred to herein as ports) to a cloud switch implemented by cloud services provided by a cloud service provider via a management interface provided by the cloud switch. For example, the cloud switch may receive a first request by a network administrator of an enterprise network to add a first port to the cloud switch.

In one embodiment, ports of the cloud switch (which may be referred to as "cloud ports") can be configured/activated in two different forms—in the form of a logical cloud port (which may also be referred to herein as a "logical port" or a "virtual port" of the cloud switch) or in the form of a physical cloud port (which may also be referred to herein as a "physical port" of the cloud switch). Logical cloud ports are generally used to provide connectivity between the cloud switch and cloud services or resources (e.g., compute resources, database resources, or a purpose-build virtual machine (VM)) provided by the cloud service provider. Assuming the first request relates to creation of a logical cloud port, in response to the first request the cloud switch creates the logical cloud port.

Subsequently, the cloud switch may receive a second request by the network administrator to add a second port to the cloud switch in a form of a physical cloud port. In one embodiment, physical cloud ports are used to provide connectivity between a physical, on-premises network infrastructure component (e.g., a physical switch) of multiple physical network infrastructure components within the enterprise network (which may potentially be geographically distributed among various sites of the enterprise) and the cloud switch. In response to the second request, the cloud switch creates the physical cloud port. In one embodiment, the cloud switch becomes aware of the physical network infrastructure components within the enterprise network via a discovery process. In one embodiment, the discovery process may be similar to that used by the FortiSwitch cloud service available from the assignee of the present invention. Further information regarding the FortiSwitch cloud service discovery process is described in FortiSwitch Cloud—Administration Guide Version 4.1.a, which is hereby incorporated by reference in its entirety for all purposes.

Continuing with the present example, next, the cloud switch may receive requests to form associations between the created cloud ports and network services provided by the cloud service provider and/or between the ports and physical on-premises network infrastructure. For example, a third request may be received from the network administrator via the management interface to create an association between the logical cloud port and a particular resource of multiple resources provided by the cloud service provider. In response to the third request, the cloud switch creates the association between the logical cloud port and the particular resource. Furthermore, the cloud switch may receive a fourth request by the network administrator to create an association between the physical cloud port and a physical port of a physical network infrastructure component of multiple physical network infrastructure components potentially spanning multiple sites of the enterprise. In response to the fourth request, the cloud switch creates the requested association between the physical cloud port and the physical port of the physical network infrastructure component.

Additionally, the network administrator may wish to perform other operations on the cloud ports created within the cloud switch. Non-limiting operations that may be provided by the cloud switch pertaining to cloud ports of the cloud switch include, adding or removing the cloud port to or from a specific group or subgroup, configuring the cloud port as trusted/untrusted for one or more applications, device identification and auto-configuration, and monitoring activity at a granular level or at the application level.

FIG. 1 illustrates a simplified network architecture 100 in which aspects of the present invention can be implemented in accordance with an embodiment of the present invention. In context of architecture 100, a cloud service 104 may be provided by a cloud service provider using a cloud switch 102 that can be configured as part of a VPC of an enterprise network. Various embodiments can provide for creation and configuration of various ports e.g., logical cloud ports 108 and physical cloud ports 110-1, 110-2, . . . , 110-N (which may be collectively referred to as physical cloud ports 110 and may be individually referred to as physical cloud port 110, hereinafter) for enabling cloud switch 102 to grow over time in terms of cloud ports in accordance with the needs of the enterprise. Those skilled in the art will appreciate that a "port" is the basic unit of connectivity of a hardware switch, so this terminology is used for cloud switch 102 as well. Creation and configuration of a number of logical cloud ports 108 and physical cloud ports 110 (which may be collectively referred to simply as cloud ports, herein) by cloud switch 102 enables cloud service 104 to become infinitely scalable as cloud switch 102 can add cloud ports as the organization or enterprise network grows—limited only by the underlying cloud resources.

Embodiments of the present disclosure further provide an integration of VPC or any other cloud network of an enterprise with physical on-premises/remote components of the enterprise network, e.g., physical switch 112-1, 112-2 and 112-N (which may be collectively referred to as physical switches 112 and may be individually referred to as physical switch 112, hereinafter). Therefore, in a hybrid environment, an organization or an enterprise can be easily grow in either the cloud or in on-premises physical infrastructure or both.

According to an aspect, cloud switch 102 is a single switch represented in the form of software implemented within cloud service 104. Cloud switch 102 includes a number of cloud ports, which can be configure as logical cloud ports 108 or physical cloud ports 110 at the time the cloud port is added to cloud switch 102, for example. Each logical cloud port 108 can provide connectivity to a resource provided by cloud service provider. Non-limiting examples of resources include cloud storage, virtual machines, virtual appliances, computing resources, databases or other purpose-built virtual machines that require connectivity with cloud switch 102 of an enterprise. Further, physical cloud ports 110 can provide connectivity between physical, on-premises network infrastructure components within the enterprise network and cloud switch 102. Each physical cloud port 110 of cloud switch 102 can be associated with a physical port of the physical network infrastructure component, e.g., physical switch 112. Physical switches 112 can reside within an enterprise network spanning various locations of on organizations premises, remote locations etc. and can be operatively coupled with one or more computing devices. According to an embodiment, each physical switch 112 can be registered and discovered by cloud switch 102 based on a pre-assigned cloud key corresponding to the serial number, for example, of each physical switch 112 or a bulk key (with which multiple physical switches 112 are associated) so that physical switch 112 can be managed from cloud service 104. Therefore, remote physical switches 112, which can be distributed across various geographical locations, can be discovered by cloud switch 102, stored in an inventory and mapped to physical ports 110 by a cloud service administrator 106 (which may also be referred to herein as a network administrator).

According to one embodiment, this discovery process can be facilitated by prior registration of remote physical switches 112 with the equipment vendor's online support services (e.g., FortiCare support services available from the assignee of the present invention). For example, the support services may maintain information regarding remote physical switches 112, including, but not limited to, serial numbers (from which other information, such as number of ports, type/speed of each port, etc., regarding the switch can be derived), description, shipped date, registration date, and the like. The discovery process may include creating an inventory on behalf of cloud switch 102 of remote physical switches 112 and their associated ports. The attributes discovered and maintained by cloud switch 102 may include for each discovered switch: a switch ID, a switch serial number, a switch IP address, and a switch physical configuration (e.g., number of ports and type/speed of each port). This essentially provides cloud switch 102 with an inventory of physical switches and specifically physical ports from which the network administrator can select to create appropriate associations as described further below. Further information regarding an exemplary discovery process is described in FortiSwitch Cloud—Administration Guide Version 4.1.a, which has been previously incorporated by reference herein.

According to an embodiment, cloud service 102 can provide a management interface that can be in the form of a web interface, which may allow cloud service administrator 106 to access a cloud service account and create and interact with cloud switch 102. Cloud service administrator 106 can select on-premises physical switches 112 that have been discovered and stored in an inventory by cloud switch 102 and create desired associations between physical switches 112 and cloud service 104 via physical cloud ports 110. The management interface provides great flexibility to cloud service 104 as cloud service administrator 106 can continue to add more logical cloud ports 108, physical cloud ports 110 and create connectivity across cloud and on-premises components, e.g., physical switches 112, subject only to limitations of the underlying cloud resources of cloud service 104. For efficient management of physical switches 112, the management interface can display a list of physical switches 112 managed by cloud switch 102 by providing identifying information including one or more of the serial number, host name, model, IP address, firmware version, connection time, and status of each physical switch 112, for example. The management interface can also display a ports pane identifying available logical cloud ports 108 and physical cloud ports 110 that have been created within cloud switch 102, thereby allowing cloud service administrator 106 to alter configurations and forming associations with cloud ports of cloud switch 102 as well as altering configurations including administrative status and connectivity status of physical switches 112.

Those skilled in the art will appreciate that various embodiments of the present disclosure allow complete representation of physical switches 112 hosted in cloud switch 102, however, connectivity issues with cloud service 104 during intermittent periods does not bring the whole network down as physical switches 112 continue to work seamlessly. In many cases, end users relying on physical switches 112 may not even realize that there have been issues with connectivity to the cloud, thereby eliminating the requirement for onsite technical expertise. Therefore, cloud switch 102 provides a centralized discovery, visibility, and configuration management solution without the need of on-premises hardware, software, or management overhead.

Figure 2:
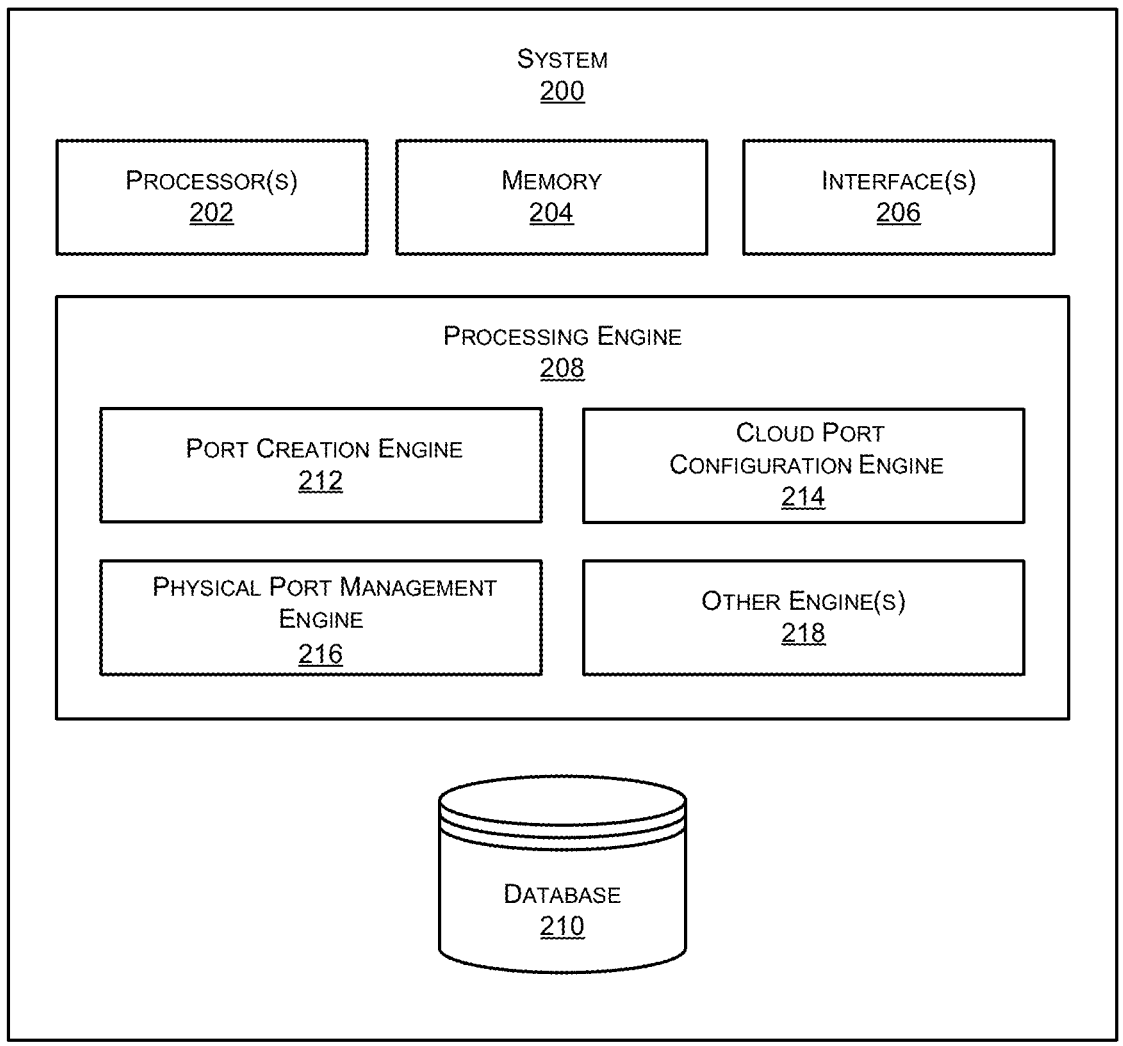
FIG. 2 illustrates exemplary functional components of a system in accordance with an embodiment of the present invention.

FIG. 2 illustrates exemplary functional components of a system 200 in accordance with an embodiment of the present invention. As illustrated, system 200, which may represent a cloud switch implemented as a cloud service within a cloud platform of a cloud service provider, can be executed on one or more processor(s) 202. Processor(s) 202 can be implemented as one or more microprocessors, microcomputers, microcontrollers, digital signal processors, central processing units, logic circuitries, and/or any devices that manipulate data based on operational instructions. Among other capabilities, processor(s) 202 are configured to fetch and execute computer-readable instructions stored in a memory 204 of system 200. Memory 204 can store one or more computer-readable instructions or routines, which may be fetched and executed to create or share the data units over a network service. Memory 204 can include any non-transitory storage device including, for example, volatile memory such as RAM, or non-volatile memory such as EPROM, flash memory, and the like. In an example embodiment, memory 204 may be a local memory or may be located remotely, such as a server, a file server, a data server, and the Cloud.

System 200 can also make use of one or more interface(s) 206. Interface(s) 206 may include a variety of interfaces, for example, interfaces for data input and output devices, referred to as I/O devices, storage devices, and the like. Interface(s) 206 may facilitate communication of system 200 with various devices coupled to system 200. Interface(s) 206 may also provide a communication pathway for one or more components of system 200. Examples of such components include, but are not limited to, processing engine(s) 208 and data 210.

Processing engine(s) 208 can be implemented as a combination of hardware and software (invoked, for example, via an API) or firmware programming (for example, programmable instructions) to implement one or more functionalities of engine(s) 208. In the examples described herein, such combinations of hardware and software or firmware programming may be implemented in several different ways. For example, the programming for the engine(s) may be processor executable instructions stored on a non-transitory machine-readable storage medium and the hardware for engine(s) 208 may include a processing resource (for example, one or more processors), to execute such instructions. In the examples, the machine-readable storage medium may store instructions that, when executed by the processing resource, implement engine(s) 208. In such examples, system 200 can include the machine-readable storage medium storing the instructions and the processing resource to execute the instructions, or the machine-readable storage medium may be separate but accessible to system 200 and the processing resource. In other examples, processing engine(s) 208 may be implemented by electronic circuitry. Data 210 can include data that is either stored or generated as a result of functionalities implemented by any of the components of processing engine(s) 208.

In an example, processing engine(s) 208 can include a port creation engine 212, a cloud port configuration engine 212, a physical port management engine 216, and other engine(s) 218. Other engine(s) 218 can implement functionalities that supplement applications or functions performed by system 200 or processing engine(s) 208.

According to an embodiment, port creation engine 212 can receive requests from a network administrator of an enterprise network pertaining to adding cloud ports to the cloud switch. For example, a first request may be received from the network administrator via a graphical user interface providing a management interface to the cloud switch (e.g., cloud switch 102) to add a cloud port in the form of a physical cloud port. As mentioned above, in one embodiment, there are two types of cloud ports implemented by the cloud switch—logical cloud ports and physical cloud ports. A logical cloud port can be used, for example, to provide connectivity between the cloud switch and one of multiple resources (e.g., network services) provided by the cloud service provider.

In response to receipt of the first request pertaining to creation of a logical cloud port, port creation engine 212 can create the logical cloud port by invocation of an appropriate method of an application programming interface (API), for example. In one embodiment, a create cloud port API method creates and stores software data structures having various attributes of the cloud port. Non-limiting examples of cloud port attributes include the name of the port, the name of the switch it belongs to, the capabilities the port offers, such as Virtual Local Area Network (VLAN), access control (is it open by default for any traffic or only for specific traffic identified by application type, etc.), counters for bytes, packets, types of packets and the like. In one embodiment, when a cloud port is created within the cloud switch, it is created as a logical cloud port by default.

For sake of illustration, a non-limiting example of a basic cloud port data structure to store cloud port attributes and associated pseudo code relating to the create cloud port API method are provided below:

```
CLOUD_PORT {portid, name, type, union
    {PHYSICAL_PORT, LOGICAL_PORT}, CONFIGU-
    RATION}
LOGICAL_PORT {URL /* Cloud switch URL */,
    account /* Cloud switch service account */, logical-
    port /* Cloud switch service unique identification for
    a logical port within a service account */}
PHYSICAL_PORT    {switchid,    switchIP,
    portnumber . . . }
CONFIGURATION (features)
CLOUD_PORT_create_cloud_port( )
{
    allocate memory for CLOUD_PORT;
    create GUI representation;
    set type to "logical";
    return PORT_ID;
}
```

Further, port creation engine 212 can receive a second request by the network administrator to add a second port to the cloud switch in a form of a physical cloud port. The physical cloud port can be used to provide connectivity to between a physical, on-premises network infrastructure component of multiple physical network infrastructure components (e.g., switches) within the enterprise network and the cloud switch.

In response to the second request, port creation engine 212 can create the physical cloud port by invoking of an appropriate method of the API, for example. In one embodiment the same API method, albeit with different parameters, may be used for both creation of logical cloud ports and creation of physical cloud ports. As above, in one embodiment, a create cloud port API method creates and stores software data structures having various attributes of the cloud port. Non-limiting examples of cloud port attributes include the name of the port, the name of the switch it belongs to, the capabilities the port offers, such as Virtual LAN (VLAN), access control (is it open by default for any traffic or only for specific traffic identified by application type, etc.), counters for bytes, packets, types of packets and the like.

In one embodiment, the cloud switch performs a discovery process to learn about the existence and attributes of the physical switches within the enterprise network at issue. This essentially provides the cloud switch with an inventory of physical switches and specifically physical ports from which the network administrator can select to create desired associations.

After one or more cloud ports (e.g., physical cloud ports and/or logical cloud ports) have been created, the network administrator may request to configure the cloud ports and/or form associations between the cloud ports and resources of the multiple resources provided by the cloud service provider or ports of physical switches within the enterprise network (e.g., located on-premises within one or more sites of the enterprise). For sake of illustration, a non-limiting example of pseudo code relating to a configure cloud port API method is provided below:

```
_configure_cloud_port(port-id)
{
    prompt admin for features supported by cloud service
        VLAN
        User Authentication (IEEE 802.1x, for example)
        Endpoint discovery and identification
        . . . .
    Set port data structure and start respective processes to
        enable the features on this cloud port.
}
```

When the network administrator requests to form an association between an earlier created logical cloud port and a particular resource of the multiple resources via the management interface of the cloud switch, cloud port configuration engine 214 can receive the request (a third request in the context of the current example) from the network administrator to create the association. In response to the third request, cloud port configuration engine 214 can create the association between the cloud port and the particular resource by invocation of an appropriate method of the API, for example. In this manner, in one embodiment, the network administrator may use a particular logical cloud port to connect to a network service implemented in the cloud (e.g., in cloud service 104 or other cloud services employed by the enterprise). Alternatively or additionally, the network administrator may choose to create a one-to-one mapping between a physical port on a remote physical switch and a physical cloud port. For example, the network administrator may request to map a physical cloud port to a physical port available in the 'inventory' as described above. In one embodiment, a physical port in inventory is identified by its switch number or switch name and port number or port name. As such, the mapping can be initiated, for example, by the network administrator simply selecting the physical cloud port and the corresponding physical port in inventory via the management interface. This mapping process may result in putting the appropriate identification information of the selected physical port in inventory into a physical-port field of a cloud-port data structure. In one embodiment, when a cloud-port is not mapped to any physical port, this field is empty, which may mean the cloud-port is being used to connect to other services in the cloud itself, for example.

According to an embodiment, physical port management engine 216 can receive a request (a fourth request in the context of the present example) by the network administrator to create an association between a previously created physical cloud port and a physical port of a physical network infrastructure component of multiple physical network infrastructure components. In response to the fourth request, the cloud switch can create the association between the physical cloud port and the physical port of the physical network infrastructure component. For sake of illustration, a non-limiting example of associated pseudo code relating to an API method (e.g., map_physical_port_to_cloud_port) for mapping of a physical port of a physical network infrastructure component of the enterprise network to a physical cloud port is provided below:

```
_map_physical_port_to_cloud_port(CLOUD_PORT,
    PHYSICAL_PORT)
```

```
{
    set type of CLOUD_PORT to 'physical'
    transfer(copy) physical port details into CLOUD-
        _PORT data structure
    create background processes to maintain mapping real
        time for configuration and monitoring
}
```

According to one embodiment, one a physical cloud port has been mapped, the network administrator only has to deal with the cloud port for any configuration, monitoring and the like even though the actual physical port where config/monitoring commands are enforced may be remote. In this manner, the network administrator is provided with a seamless experience for administrative functions regardless of whether the cloud port at issue is a logical cloud port or a physical cloud port.

According to an embodiment, cloud port configuration engine 214 and physical port management engine 216 can define policies used to set traffic paths based on several factors such as performance, security etc. For example, a traffic coming from each port (including a logical cloud port associated with a resource or a physical cloud port associated with a physical port of a physical network infrastructure component) can be routed to system 200 for inspection, analysis and other related actions.

Figure 3:
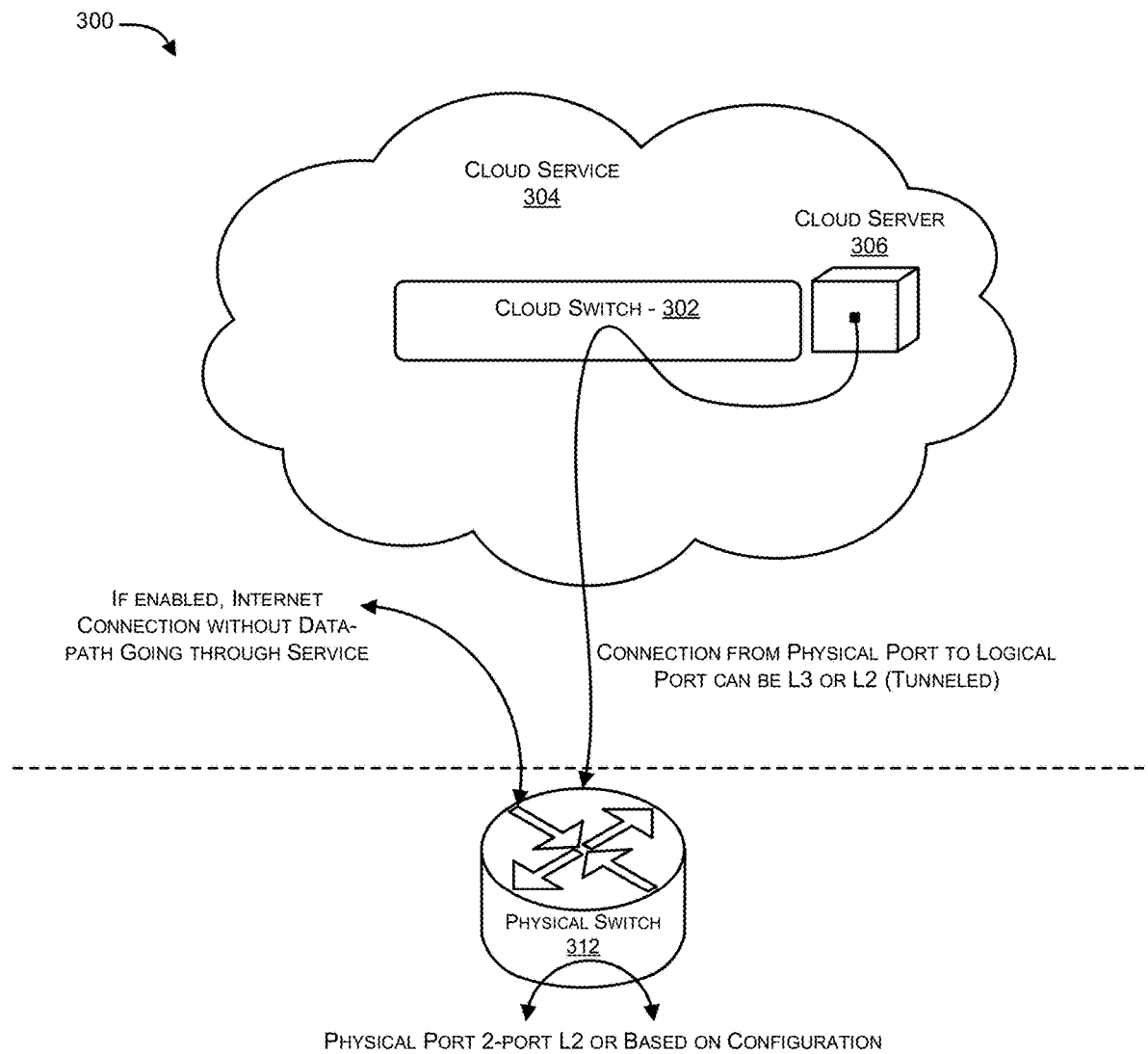
FIG. 3 illustrates various exemplary connections and data path packet flow between a cloud switch and physical on-premises network infrastructure and network services in accordance with an embodiment of the present invention.

FIG. 3 illustrates an architectural view 300 of various exemplary connections and data path packet flow between a cloud switch 302 and physical on-premises network infrastructure and network services in accordance with an embodiment of the present invention. In one embodiment, policies within cloud switch 302 can be used to set traffic paths based on one or more of multiple factors, including, but not limited to performance and security. For example, traffic coming from each cloud port (whether connected to a cloud resource or mapped to a physical port of an on-premises physical switch) of cloud switch 302 can be routed to a core cloud-switch service (not shown) for inspection, analysis and related actions. Alternatively, the policy can be set to directly route traffic between two or more ports. For example, traffic between two physical cloud ports that are mapped to physical ports, where these two physical cloud ports are in the same Layer 2 domain and located in the same physical site may be directly routed. Also, if enabled, an Internet connection may be provided without the data path going through cloud switch 302.

According to one embodiment, any cloud port (e.g., any physical cloud port or logical cloud port) can be added to a single Layer 2 domain (e.g., a VLAN). When the network administrator configures a logical cloud port to be connected with a cloud resource (e.g., cloud server 306), based on a policy configuration associated with the logical cloud port, cloud switch 302 may create a tunnel between cloud switch 302 (or a newly instantiated VM associated therewith) and the cloud resource (which may be within the same cloud service or within a different cloud service). Those skilled in the art will appreciate that based on the policy configuration associated with a particular cloud port ingress/egress traffic associated with different applications may be tunneled or routed directly to the cloud resource. Similar tunnel establishment may occur when a physical cloud port is mapped to an on-premises physical port; however, in this case, the tunnel is established between cloud switch 302 and the on premise physical switch, which based on its service configuration, routes traffic from its ports through the tunnel or outside of the tunnel.

In the context of the present example, when a user, e.g., the network administrator or the cloud service administrator configures a logical cloud port to be associated with cloud server 306, cloud service 304 can create a tunnel between cloud server 306 and the logical cloud port. Based on a defined policy of the logical cloud port, traffic associated with different applications to/from cloud server 306 can be tunneled from/to the logical cloud port of cloud switch 302 or routed directly. Similarly, a tunnel can be established when a physical cloud port of cloud switch 302 is associated with an on-premises physical port, e.g., physical switch 312. Physical switch 312, based on its service configuration can route traffic from its physical port through the tunnel or outside the tunnel. As the bandwidth requirements for tunneled traffic is low, a variety of switch models from low end to high end can participate in accordance with architecture 300. While not illustrated by FIG. 3 another traffic path might involve traffic being exchanged between on-premises physical switch 312, located, for example, at a first site of an enterprise and another physical switch (not shown), for example, located at a second site of the enterprise.

Figure 4:
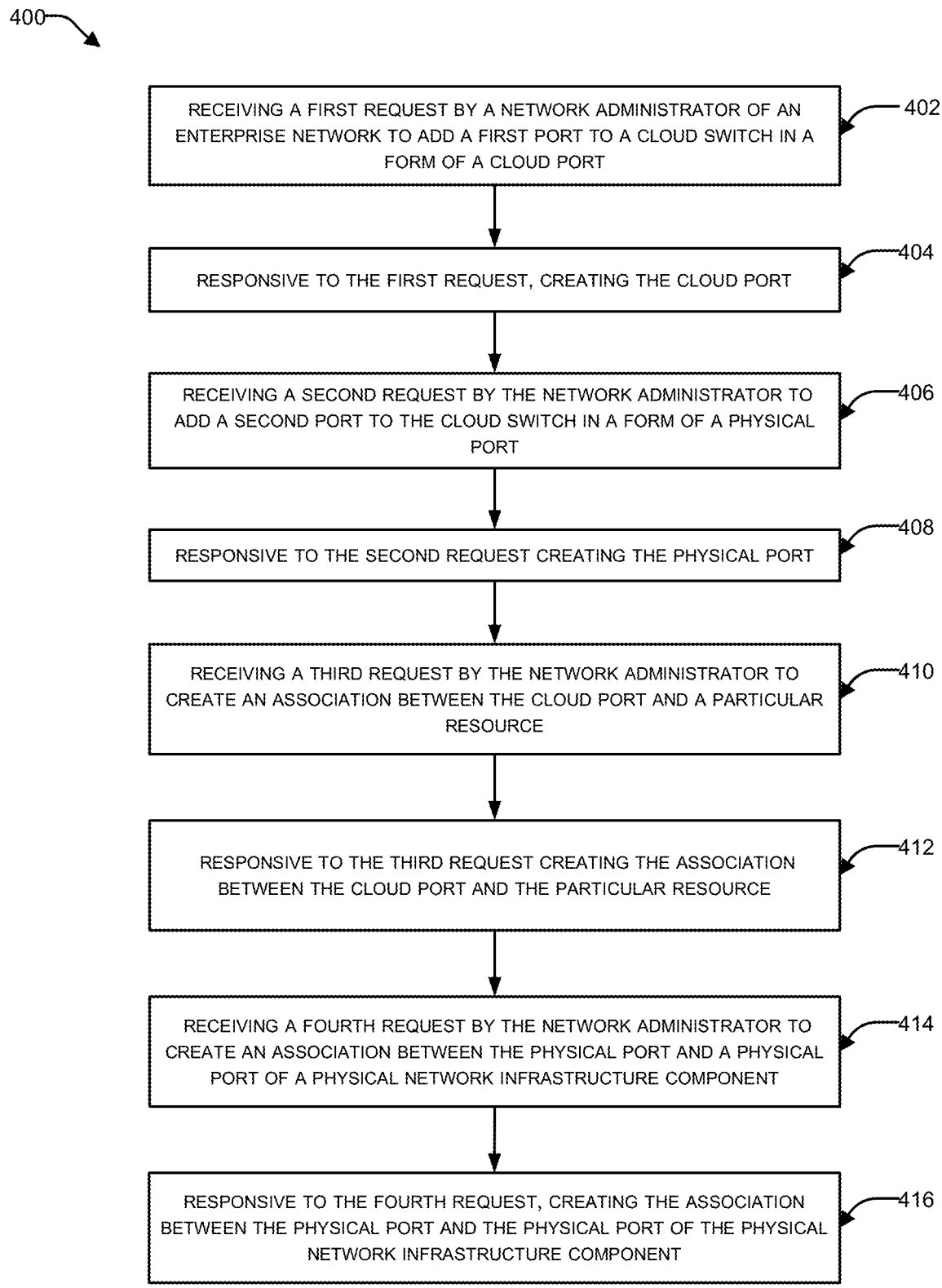
FIG. 4 is a high-level flow diagram illustrating a configuration and usage scenario of a cloud switch in accordance with an embodiment of the present invention.

FIG. 4 is a high-level flow diagram 400 illustrating a configuration and usage scenario of a cloud switch in accordance with an embodiment of the present invention. In context of the present example, at block 402, a cloud switch implemented by cloud services provided by a cloud service provider can receive a first request by a network administrator of an enterprise network to add a first cloud port to the cloud switch in the form of a logical cloud port. The cloud port can be used to provide connectivity to one of multiple resources provided by the cloud service provider. In response to the first request, at block 404, the cloud switch can create the logical cloud port. At block 406, the cloud switch can receive a second request by the network administrator to add a second cloud port to the cloud switch in a form of a physical cloud port. The physical cloud port can be used to provide connectivity between a physical, on-premises network infrastructure component of multiple physical network infrastructure components within the enterprise network and the cloud switch. In response to the second request, at block 408, the cloud switch can create the physical cloud port.

Further, at block 410, the cloud switch can receive a third request by the network administrator to create an association between the logical cloud port and a particular resource of the multiple cloud resources. In response to the third request, at block 412, the cloud switch can create the association between the logical cloud port and the particular resource. Furthermore, at block 414, the cloud switch can receive a fourth request by the network administrator to create an association between the physical cloud port and a physical port of a physical network infrastructure component of the plurality of physical network infrastructure components. In response to the fourth request, at block 416, the cloud switch can create the association between the physical cloud port and the physical port of the physical network infrastructure component.

Figure 5A:
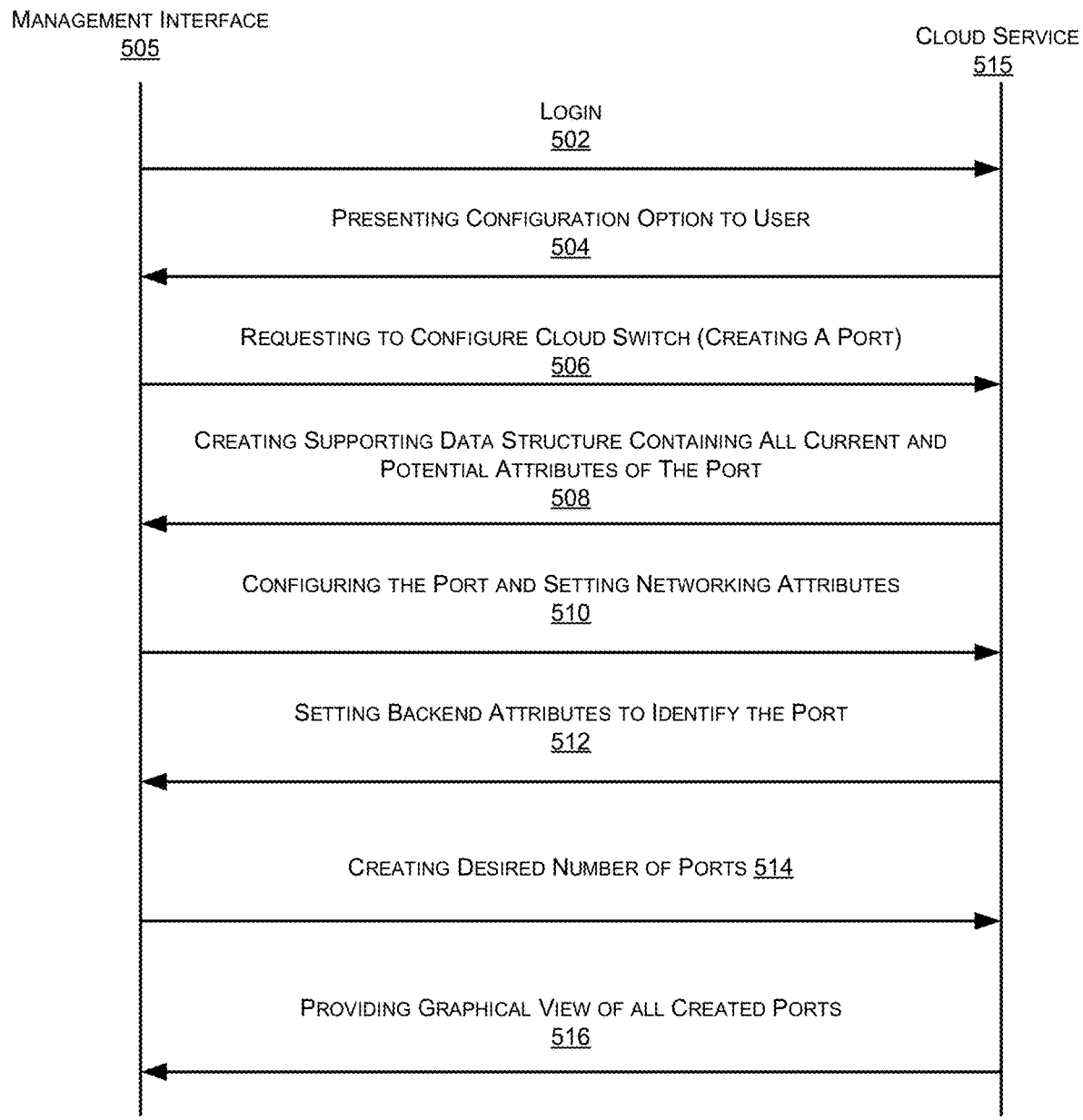
FIGS. 5A-C illustrate exemplary interactions with a cloud service in accordance with an embodiment of the present invention.
Figure 5B:
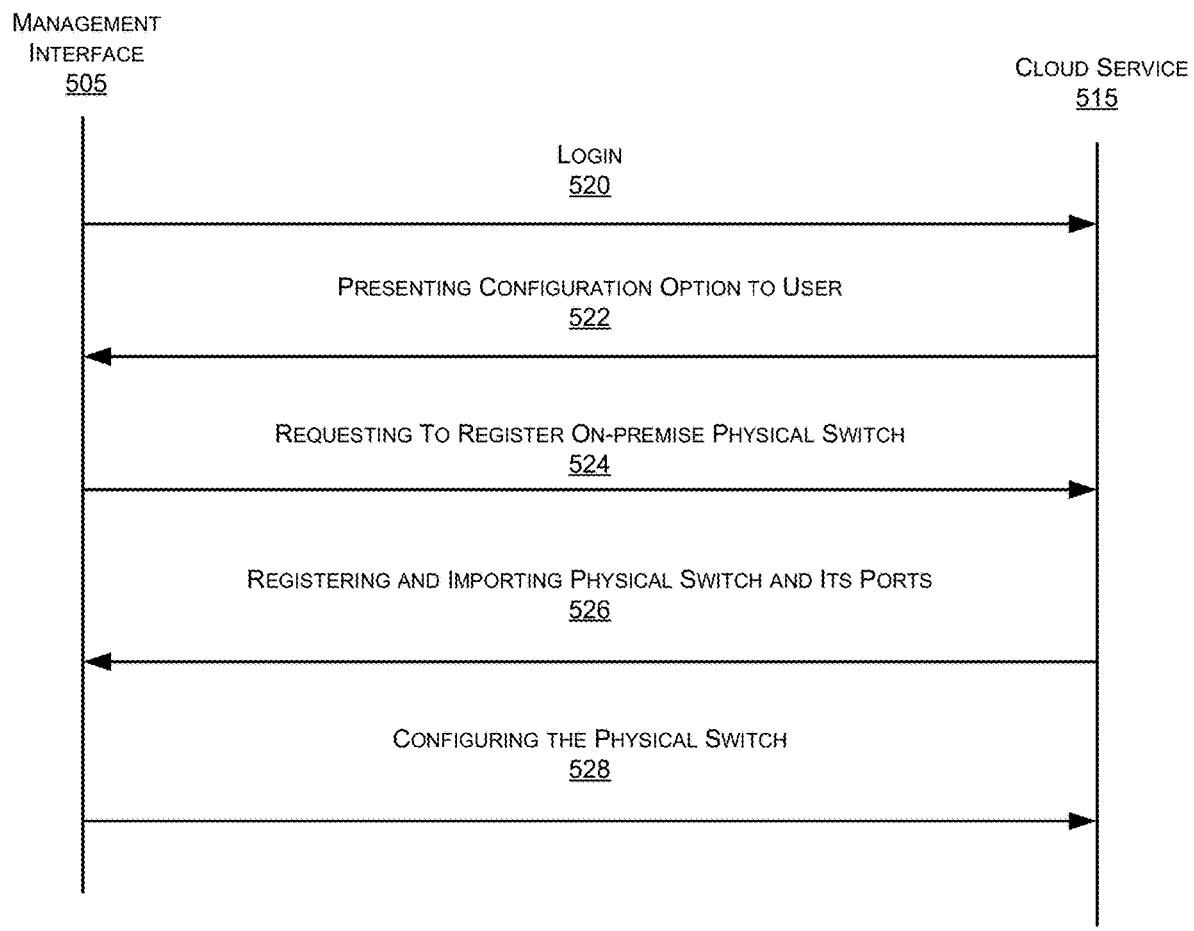
Figure 5C:
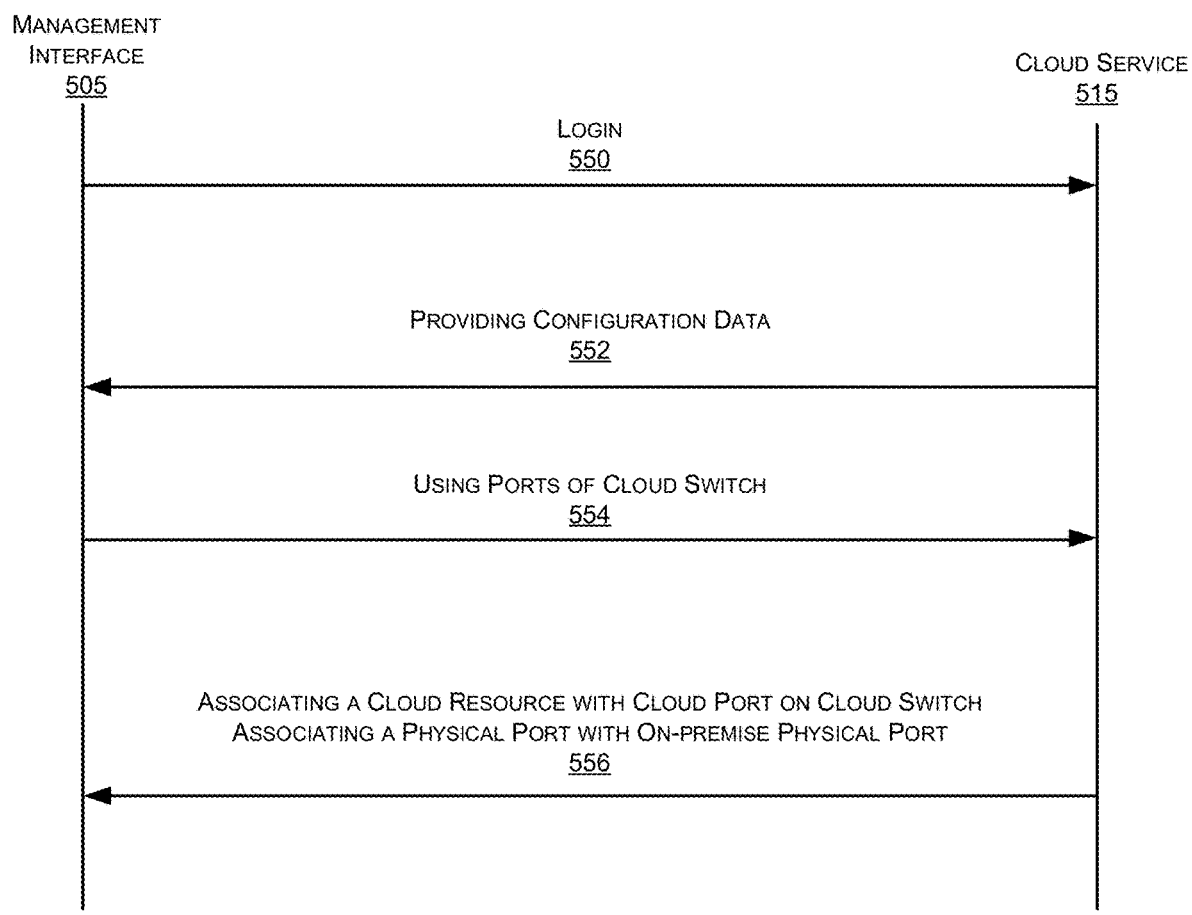

FIGS. 5A-C illustrate exemplary interactions with a cloud service 515 in accordance with an embodiment of the present disclosure.

FIG. 5A is a sequence diagram illustrating port creation in a cloud switch (not shown) implemented by a cloud service 515 in accordance with an embodiment of the present invention. In the context of the present example, at block 502, a user (e.g., a network administrator or a cloud service administrator) can login to access cloud service 515 using a management interface 505. At 504, cloud service 515 can present configuration options to the user via management interface 505. At 506, the user can request to configure the cloud switch by creating a cloud port, where the cloud port can be a logical cloud port to provide connectivity to a cloud resource or a physical cloud port to provide connection to an on-premises physical port. In response, at 508, the cloud switch can create supporting data structures containing all current and potential attributes of the cloud port and present the associated information on management interface 505. Further, at 510, the user can configure the cloud port and can set networking attributes, e.g., VLAN, subnet, security access, etc. At 512, the cloud switch can set backend attributes to identify the cloud port so that the cloud port can provide connectivity to the cloud resource or the on-premises physical port. In a similar manner as described above, at 514, the user can create the desired number of cloud ports. Cloud ports can be added as needed and deleted when no longer being used. At 516, cloud switch can provide a graphical view of all created cloud ports on management interface 505 and can list configuration details of each cloud port.

FIG. 5B is a sequence diagram illustrating association of on-premises physical ports with a cloud switch implemented by cloud service 515 in accordance with an embodiment of the present invention. In the context of the present example, at 520, the user can login to access cloud service 515 using management interface 505. At 522, the cloud switch can present configuration option to the user. At 524, the user can request to register an on-premises physical switch with cloud switch. At 526, cloud switch can register the on-premises switch and on-premises switch can ping cloud service 515. If the on-premises switch is registered, the switch and its ports can be imported into cloud service 515 by the cloud switch such that the on-premises physical switch can be controlled by cloud service 515. At 528, the user can configure the physical switch and its ports using configuration options presented, for example, via management interface 505 by cloud service 515.

FIG. 5C is a sequence diagram illustrating an example of using various cloud ports of a cloud switch implemented by cloud service 515 in accordance with an embodiment of the present invention. In the context of the present example, at 550, the user can login to access cloud service 515 via management interface 505. At 552, the cloud switch can provide configuration data that can include cloud ports as well as their respective configurations and a physical resource pool (the inventory) of imported on-premises switches/ports. At 554, management interface 505 can allow a user to use the cloud ports to associate a cloud resource to a logical cloud port of the cloud switch or to associate a physical cloud port from the imported resource pool to a physical port of the cloud switch. At 556, if a user associates the cloud resource to the logical cloud port on the cloud switch, cloud service 515 can create a connection between the logical cloud port and the cloud resource, based on the configuration data selected by the user. Alternately, if the user associates an on-premises physical port with a physical cloud port of the cloud switch, cloud service 515 can use a tunnel between itself and the on premises physical switch to securely tunnel appropriate traffic between the on-premises physical port and the physical cloud port and then forward the traffic appropriately.

The following two flow diagrams illustrate core packet data flow. They intentionally do not call out details of additional packet processing that may be performed, including deep packet inspection and visibility into users' network activity, so as to focus on the core forwarding aspects.

Figure 6:
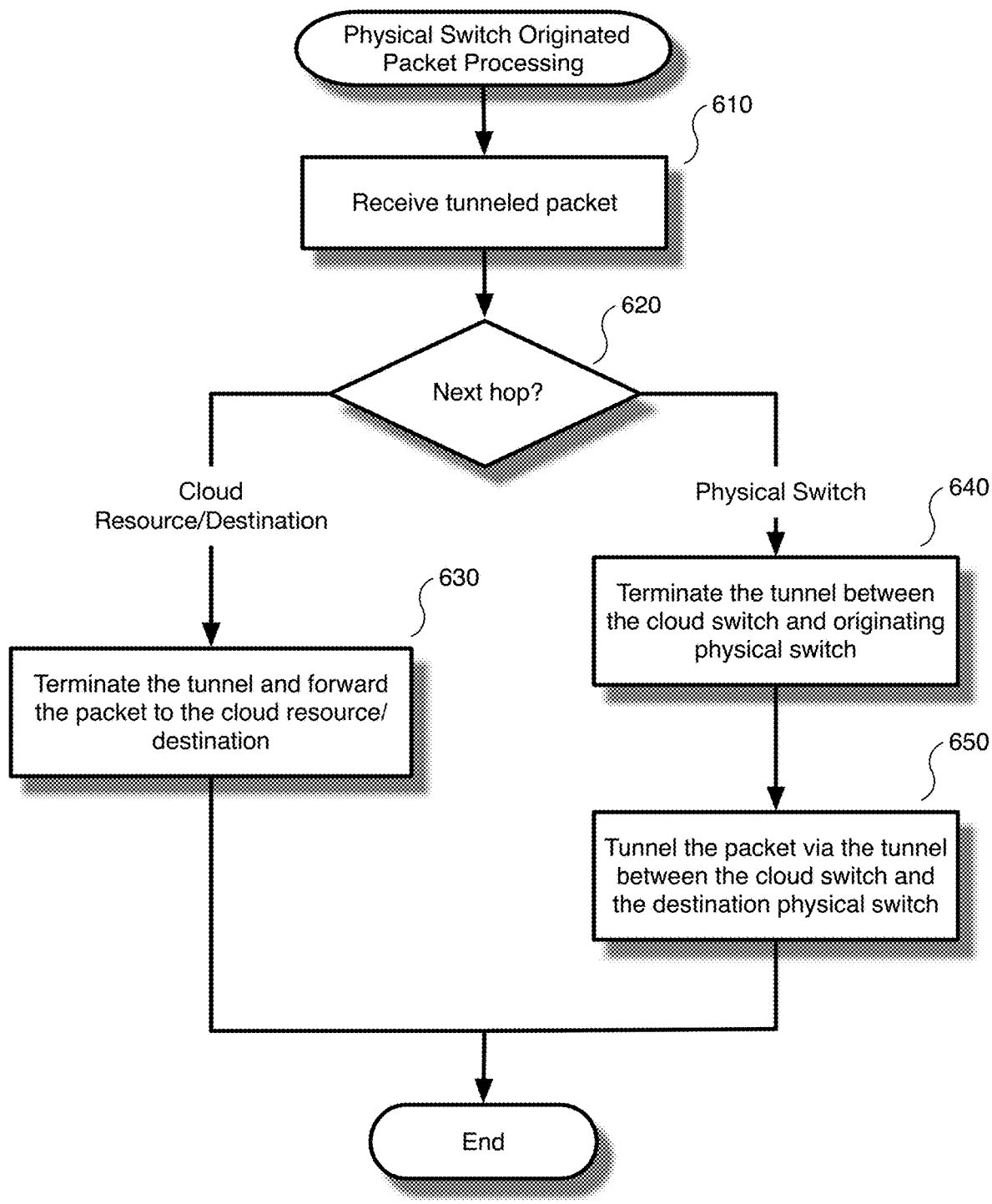
FIG. 6 is a flow diagram illustrating physical switch originated packet processing in accordance with an embodiment of the present invention.

FIG. 6 is a flow diagram illustrating physical switch originated packet processing in accordance with an embodiment of the present invention. In the context of the present example, it is assumed a user packet (e.g., a packet from a user device coupled to a physical switch within an enterprise network) has been originated and transmitted to the physical switch. The physical switch makes a decision regarding whether to locally forward the packet, forward the packet to the Internet or to forward the packet through a tunnel established between the physical switch and the cloud switch.

Prior to block 610, it is assumed the physical switch has determined the packet is to be forwarded through the tunnel between the physical switch and the cloud switch and the physical switch has added an appropriate tunnel header to the packet identifying the source switch/port, destination (cloud switch), and final destination, if needed, and forwarded the tunneled packet via the tunnel to the cloud switch.

At block 610, the tunneled packet is received by the cloud switch. More specifically, the tunneled packet is received by the physical cloud port that has previously been mapped to the physical port of the physical switch.

At decision block 620, the cloud switch determines the next hop for the received tunneled packet. For example, based on the tunnel header added by the physical switch and the destination specified in the user packet, the cloud switch determines whether the next hop is another physical switch associated with the enterprise network (potentially located at the same or a different site than the originating physical switch) or a cloud resource/destination. When it is determined the next hop for the packet is a cloud resource/destination, processing continues with block 630; otherwise, processing branches to block 640.

At block 630, the tunnel between the cloud switch and the originating physical switch is terminated by removing the tunnel header and the packet is forwarded to the cloud resource/destination via a logical cloud port of the cloud switch associated with the cloud resource/destination. At this point, processing of the received tunneled packet is complete.

At block 640, the tunnel between the cloud switch and the originating physical switch is terminated by removing the tunnel header.

At block 650, the packet is tunneled via a second tunnel between the cloud switch and the destination physical switch and forwarded to the destination physical switch via the second tunnel by forwarding it to a second physical cloud port associated with the destination physical switch. In one embodiment, the packet is prepared for tunneling via the second tunnel by the second physical cloud port adding a tunnel header specifying the source switch/port (the cloud switch and a port ID of the second physical cloud port) and the destination switch/port. At this point, processing of the received tunneled packet by the cloud switch is complete. For completeness however, it is noted that upon receipt of the tunneled packet by the destination physical switch, it terminates the tunnel between the cloud switch and the destination physical switch by removing the tunnel header added by the cloud switch and forwards the packet to the destination endpoint based on the destination specified in the packet.

Figure 7:
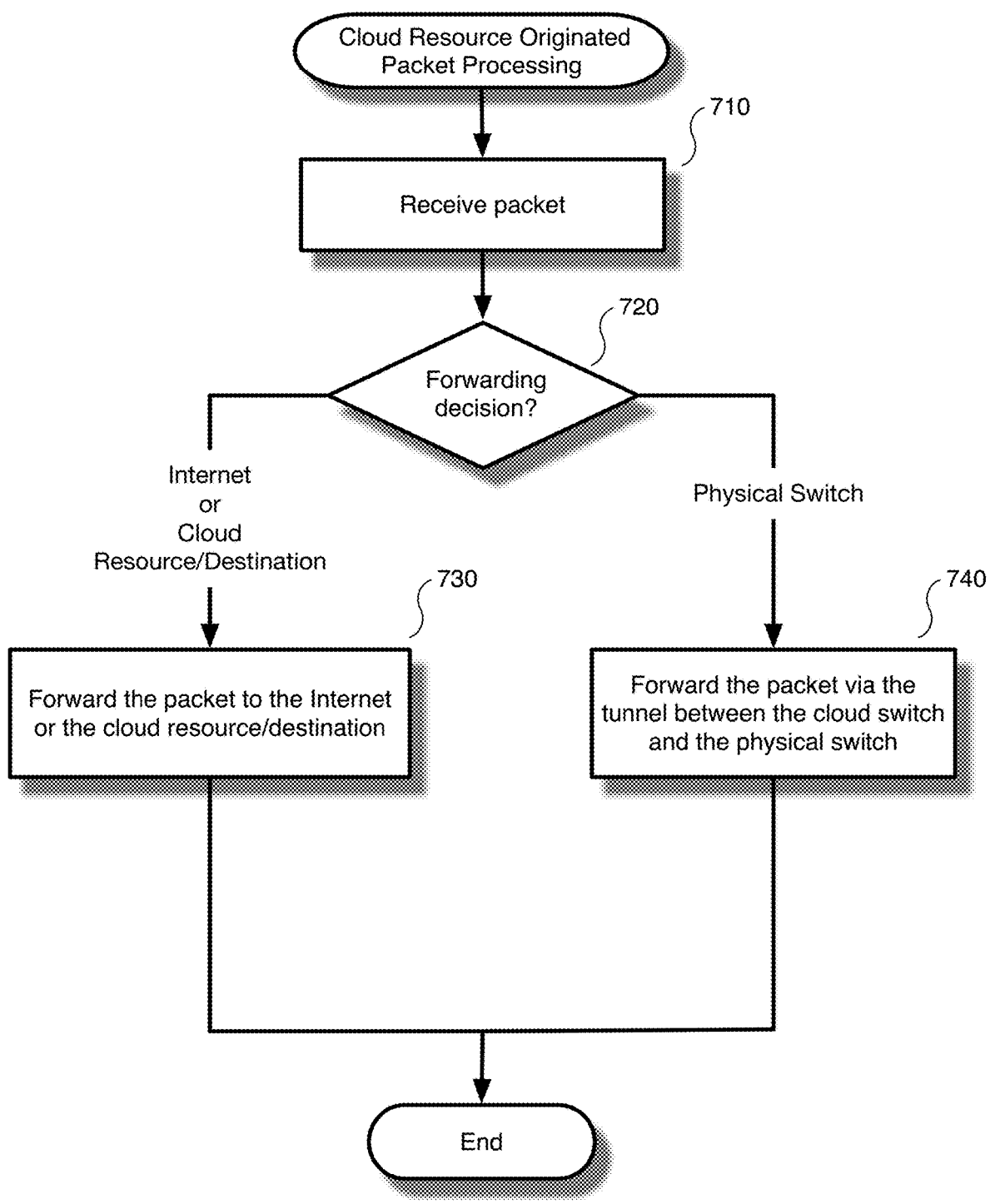
FIG. 7 is a flow diagram illustrating cloud resource originated packet processing in accordance with an embodiment of the present invention.

FIG. 7 is a flow diagram illustrating cloud resource originated packet processing in accordance with an embodiment of the present invention. In the context of the present example, it is assumed a user packet has been originated by a cloud resource (e.g., VM servers or a storage service) and has been transmitted by the cloud resource to the cloud switch. At block 710, the packet is received on the logical cloud port of the cloud switch to which the resource has previously been associated.

At block 720, the cloud switch makes a forwarding decision regarding the received packet. For example, the packet may be forwarded to another cloud resource, forwarded to the Internet or forwarded though a tunnel towards a destination (e.g., an endpoint) associated with a physical switch. If the forwarding decision indicates the packet is to be forwarded to the Internet or a cloud resource/destination, then processing continues with block 730; otherwise, processing branches to block 740.

At block 730, the packet is forwarded to the Internet or the cloud resource/destination and processing of the packet is complete.

At block 740, the packet is forwarded via a previously established tunnel between the cloud switch and the physical switch. In one embodiment, the packet is prepared for tunneling via the tunnel by a physical cloud port mapped to an appropriate port of the physical switch adding a tunnel header specifying the source switch/port (the cloud switch and a port ID of the physical cloud port) and the destination switch/port. At this point, processing of the received packet by the cloud switch is complete. For completeness however, it is noted that upon receipt of the tunneled packet by the destination physical switch, it terminates the tunnel between the cloud switch and the destination physical switch by removing the tunnel header added by the cloud switch and forwards the packet to the destination endpoint based on the destination specified in the packet.

Figure 8:
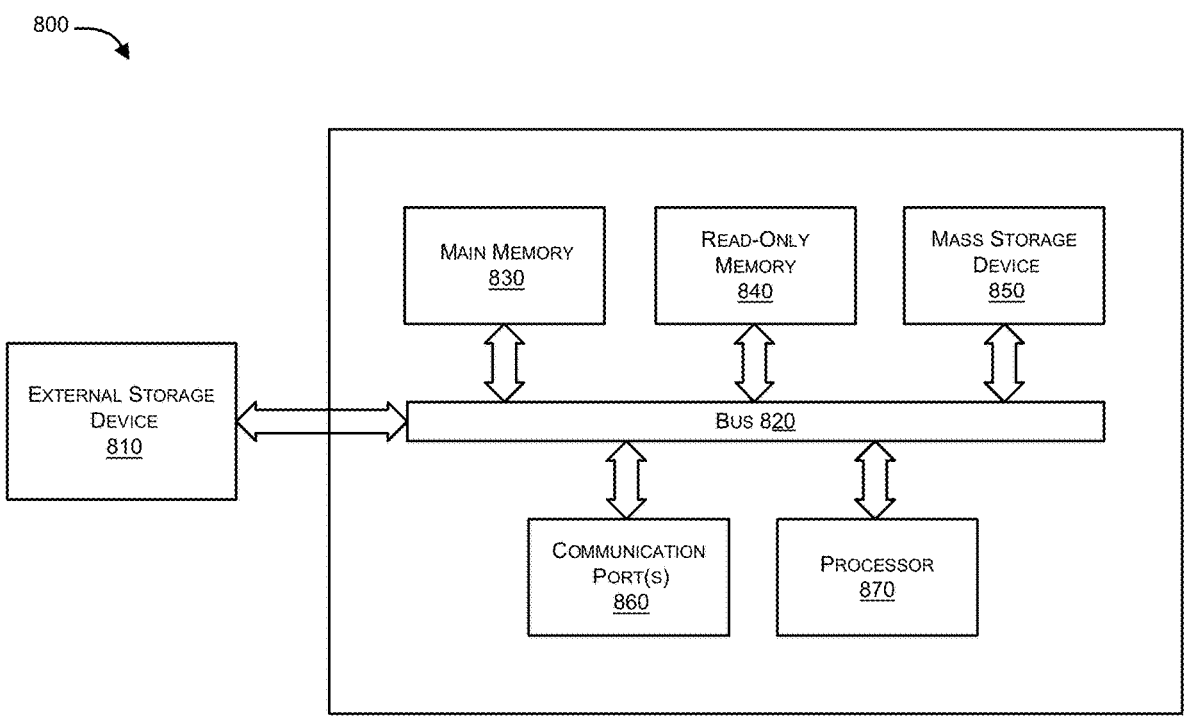
FIG. 8 illustrates an exemplary computer system in which or with which embodiments of the present invention may be utilized.

FIG. 8 illustrates an exemplary computer system 800 in which or with which embodiments of the present invention may be utilized. Computer system 800 may represent all or a portion of hardware resources of a cloud service provider on which a cloud switch (e.g., cloud switch 102) is executed.

As shown in FIG. 8, computer system includes an external storage device 810, a bus 820, a main memory 830, a read only memory 840, a mass storage device 850, a communication port 860, and a processor 870.

Those skilled in the art will appreciate that computer system 800 may include more than one processor 870 and communication ports 860. Examples of processor 870 include, but are not limited to, an Intel® Itanium® or Itanium 2 processor(s), or AMD® Opteron® or Athlon MP® processor(s), Motorola® lines of processors, Forti-SOC™ system on a chip processors or other future processors. Processor 870 may include various modules associated with embodiments of the present invention.

Communication port 860 can be any of an RS-232 port for use with a modem based dialup connection, a 10/100 Ethernet port, a Gigabit or 10 Gigabit port using copper or fiber, a serial port, a parallel port, or other existing or future ports. Communication port 860 may be chosen depending on a network, such a Local Area Network (LAN), Wide Area Network (WAN), or any network to which computer system connects.

Memory 830 can be Random Access Memory (RAM), or any other dynamic storage device commonly known in the art. Read only memory 840 can be any static storage device(s) e.g., but not limited to, a Programmable Read Only Memory (PROM) chips for storing static information e.g. start-up or BIOS instructions for processor 870.

Mass storage 850 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K1000), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 820 communicatively couples processor(s) 870 with the other memory, storage and communication blocks. Bus 820 can be, e.g. a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 870 to software system.

Optionally, operator and administrative interfaces, e.g. a display, keyboard, and a cursor control device, may also be coupled to bus 820 to support direct operator interaction with computer system. Other operator and administrative interfaces can be provided through network connections connected through communication port 860. External storage device 810 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM). Components described above are meant only to exemplify various possibilities. In no way should the aforementioned exemplary computer system limit the scope of the present disclosure.

Thus, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document terms "coupled to" and "coupled with" are also used euphemistically to mean "communicatively coupled with" over a network, where two or more devices are able to exchange data with each other over the network, possibly via one or more intermediary device.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

What is claimed is:

1. A method comprising:
receiving, by a cloud switch implemented by cloud services provided by a cloud service provider, a first request by a network administrator of an enterprise network to add a first cloud port to the cloud switch in a form of a logical cloud port, wherein the logical cloud port is used to provide connectivity to one of a plurality of resources provided by the cloud service provider;
responsive to the first request, creating, by the cloud switch, the logical cloud port, including allocating memory for the logical cloud port and assigning a first port ID to the logical cloud port by invoking a first method of an application programming interface (API) of the cloud switch;
receiving, by the cloud switch, a second request by the network administrator to add a second cloud port to the cloud switch in a form of a physical cloud port, wherein the physical cloud port is used to provide connectivity between a physical, on-premises network infrastructure component of a plurality of physical network infrastructure components within the enterprise network and the cloud switch;
responsive to the second request, creating, by the cloud switch, the physical cloud port, including allocating memory for the physical cloud port and assigning a second port ID to the physical cloud port by invoking a second method of the API;
receiving, by the cloud switch, a third request by the network administrator to create an association between the logical cloud port and a particular resource of the plurality of resources;
responsive to the third request, creating, by the cloud switch, the association between the logical cloud port and the particular resource by invoking a third method of the API;
receiving, by the cloud switch, a fourth request by the network administrator to create an association between the physical cloud port and a physical port of a physical network infrastructure component of the plurality of physical network infrastructure components; and
responsive to the fourth request, creating, by the cloud switch, the association between the physical cloud port and the physical port of the physical network infrastructure component, including copying details regarding the physical port into a data structure representing the physical cloud port by invoking a fourth method of the API.

2. The method of claim 1, further comprising establishing, by the cloud switch, a tunnel between the physical cloud port and the physical port of the physical network infrastructure component.

3. The method of claim 2, further comprising:
receiving from the physical network infrastructure component, by the physical cloud port, a tunneled packet via the tunnel, wherein the tunneled packet comprises a packet destined for the particular resource and originated by an endpoint device within the enterprise network that is coupled to the physical network infrastructure component;
determining, by the physical cloud port, a next hop for the tunneled packet based on a tunnel header of the tunneled packet and a destination specified in the packet;
responsive to said determining identifying the particular resource as the next hop, removing, by the physical cloud port, the tunnel header from the tunneled packet and forwarding the packet to the particular resource via the logical cloud port.

4. The method of claim 2, further comprising:
receiving from the particular resource, by the logical cloud port, a second packet destined for the endpoint device;
determining, by the logical cloud port, a forwarding decision for the second packet based on a destination specified in the second packet;
responsive to the forwarding decision indicating the second packet is to be forwarded through the tunnel, causing, by the logical cloud port, the second packet to be forwarded via the tunnel by forwarding the second packet to the physical cloud port.

5. The method of claim 4, further comprising adding, by the physical cloud port, a second tunnel header to the second packet to create a second tunneled packet and forwarding the second tunneled packet to the physical network infrastructure component via the tunnel.

6. The method of claim 1, wherein the plurality of physical network infrastructure components span multiple locations of an enterprise with which the enterprise network is associated.

7. The method of claim 6, wherein the plurality of physical network infrastructure components comprise physical switches.

8. The method of claim 7, wherein the method further comprises forming, by the cloud switch, an inventory of physical switches and associated ports from which the network administrator can select for configuration via a management interface associated with the cloud switch by performing a physical switch discovery process.

9. The method of claim 1, wherein any or a combination of the first request, the second request, the third request and the fourth request are received via a management interface operatively coupled with the cloud switch.

10. The method of claim 9, further comprising allowing, by the cloud switch, the network administrator to specify one or more policies with respect to any or a combination of the logical cloud port and the physical cloud port of the cloud switch via the management interface.

11. The method of claim 1, wherein the plurality of resources include any or a combination of cloud storage, a virtual machine server and a virtual appliance.

12. A non-transitory computer-readable storage medium embodying a set of instructions, which when executed by one or more processors of a cloud service provider, causes the one or more processors to perform a method comprising:

receiving, by a cloud switch implemented by cloud services provided by the cloud service provider, a first request by a network administrator of an enterprise network to add a first cloud port to the cloud switch in a form of a logical cloud port, wherein the logical cloud port is used to provide connectivity to one of a plurality of resources provided by the cloud service provider;

responsive to the first request, creating, by the cloud switch, the logical cloud port, including allocating memory for the logical cloud port and assigning a first port ID to the logical cloud port by invoking a first method of an application programming interface (API) of the cloud switch;

receiving, by the cloud switch, a second request by the network administrator to add a second cloud port to the cloud switch in a form of a physical cloud port, wherein the physical cloud port is used to provide connectivity between a physical, on-premises network infrastructure component of a plurality of physical network infrastructure components within the enterprise network and the cloud switch;

responsive to the second request, creating, by the cloud switch, the physical cloud port, including allocating memory for the physical cloud port and assigning a second port ID to the physical cloud port by invoking a second method of the API;

receiving, by the cloud switch, a third request by the network administrator to create an association between the logical cloud port and a particular resource of the plurality of resources;

responsive to the third request, creating, by the cloud switch, the association between the logical cloud port and the particular resource by invoking a third method of the API;

receiving, by the cloud switch, a fourth request by the network administrator to create an association between the physical cloud port and a physical port of a physical network infrastructure component of the plurality of physical network infrastructure components; and responsive to the fourth request, creating, by the cloud switch, the association between the physical cloud port and the physical port of the physical network infrastructure component, including copying details regarding the physical port into a data structure representing the physical cloud port by invoking a fourth method of the API.

13. The non-transitory computer-readable storage medium of claim 12, wherein any or a combination of the first request, the second request, the third request and the fourth request are received via a management interface operatively coupled with the cloud switch.

14. The non-transitory computer-readable storage medium of claim 13, wherein the method further comprises establishing, by the cloud switch, a tunnel between the physical cloud port and the physical port of the physical network infrastructure component.

15. The non-transitory computer-readable storage medium of claim 14, wherein the method further comprises:
receiving from the particular resource, by the logical cloud port, a second packet destined for the endpoint device;
determining, by the logical cloud port, a forwarding decision for the second packet based on a destination specified in the second packet;
responsive to the forwarding decision indicating the second packet is to be forwarded through the tunnel, causing, by the logical cloud port, the second packet to be forwarded via the tunnel by forwarding the second packet to the physical cloud port.

16. The non-transitory computer-readable storage medium of claim 15, wherein the method further comprises adding, by the physical cloud port, a second tunnel header to the second packet to create a second tunneled packet and forwarding the second tunneled packet to the physical network infrastructure component via the tunnel.

17. The non-transitory computer-readable storage medium of claim 14, wherein the method further comprises:
receiving from the physical network infrastructure component, by the physical cloud port, a tunneled packet via the tunnel, wherein the tunneled packet comprises a packet destined for the particular resource and originated by an endpoint device within the enterprise network that is coupled to the physical network infrastructure component;
determining, by the physical cloud port, a next hop for the tunneled packet based on a tunnel header of the tunneled packet and a destination specified in the packet;
responsive to said determining identifying the particular resource as the next hop, removing, by the physical cloud port, the tunnel header from the tunneled packet and forwarding the packet to the particular resource via the logical cloud port.

18. The non-transitory computer-readable storage medium of claim 13, wherein the plurality of physical network infrastructure components span multiple locations of an enterprise with which the enterprise network is associated.

19. The non-transitory computer-readable storage medium of claim 18, wherein the plurality of physical network infrastructure components comprise physical switches.

20. The non-transitory computer-readable storage medium of claim 19, wherein the method further comprises forming, by the cloud switch, an inventory of physical switches and associated ports from which the network administrator can select for configuration via a management interface associated with the cloud switch by performing a physical switch discovery process.

* * * * *